(12) United States Patent
Tsuda et al.

(10) Patent No.: US 11,140,653 B2
(45) Date of Patent: Oct. 5, 2021

(54) TERMINAL DEVICE, INFRASTRUCTURE EQUIPMENT AND METHODS

(71) Applicants: Sony Corporation, Tokyo (JP); Sony Mobile Communications Inc., Tokyo (JP)

(72) Inventors: Shinichiro Tsuda, Basingstoke (GB); Hideji Wakabayashi, Basingstoke (GB); Vivek Sharma, Basingstoke (GB); Yuxin Wei, Basingstoke (GB); Anders Berggren, Basingstoke (GB)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 16/763,985

(22) PCT Filed: Nov. 8, 2018

(86) PCT No.: PCT/EP2018/080676
§ 371 (c)(1),
(2) Date: May 14, 2020

(87) PCT Pub. No.: WO2019/096673
PCT Pub. Date: May 23, 2019

(65) Prior Publication Data
US 2020/0280951 A1   Sep. 3, 2020

(30) Foreign Application Priority Data
Nov. 15, 2017 (EP) .................................. 17201949

(51) Int. Cl.
*H04W 24/00* (2009.01)
*H04W 64/00* (2009.01)
(Continued)

(52) U.S. Cl.
CPC ............ *H04W 64/003* (2013.01); *G01C 5/06* (2013.01); *G01S 5/0284* (2013.01); *G01S 19/47* (2013.01); *H04W 40/244* (2013.01); *H04W 88/06* (2013.01)

(58) Field of Classification Search
CPC . H04W 40/244; H04W 64/00; H04W 64/003; H04W 76/10; H04W 88/06
(Continued)

(56) References Cited

U.S. PATENT DOCUMENTS 9,131,347 B2   9/2015 Venkatraman et al.
9,234,965 B2 * 1/2016 Venkatraman .......... G01S 19/46
(Continued)

FOREIGN PATENT DOCUMENTS

WO   2016/023576 A1   2/2016

OTHER PUBLICATIONS

International Search Report and Written Opinion dated Feb. 12, 2019 for PCT/EP2018/080676 filed on Nov. 8, 2018, 10 pages.
(Continued)

Primary Examiner — Joseph Arevalo
(74) Attorney, Agent, or Firm — Xsensus LLP

(57) ABSTRACT

A terminal device for use with a wireless telecommunications network, the terminal device comprising: sensor circuitry configured to detect a value of a parameter which is variable in response to a variation in vertical position of the terminal device; receiver circuitry configured to receive, from infrastructure equipment of the wireless telecommunications network, a reference value of the parameter and a reference value of the vertical position at which the reference value of the parameter is associated; processing circuitry configured to determine a value of the vertical position of the terminal device defined relative to a second reference vertical position, wherein the determining com-
(Continued)

prises: determining the second reference vertical position based on a geographical position of the terminal device; determining a value of the vertical position of the terminal device defined relative to the first reference vertical position based on the detected value of the parameter; determining the value of the vertical position of the terminal device defined relative to the second reference vertical position based on a difference between the determined value of the vertical position of the terminal device defined relative to the first reference vertical position and the second reference vertical position.

20 Claims, 8 Drawing Sheets

(51) Int. Cl.
*G01C 5/06* (2006.01)
*G01S 5/02* (2010.01)
*G01S 19/47* (2010.01)
*H04W 40/24* (2009.01)
*H04W 88/06* (2009.01)

(58) Field of Classification Search
USPC ............ 455/456.1, 456.3, 457, 456.6, 414.2, 455/456.2, 424; 370/328
See application file for complete search history.

(56) References Cited

U.S. PATENT DOCUMENTS

| | | | |
|---|---|---|---|
| 9,671,224 B2* | 6/2017 | Karvounis | G01C 5/00 |
| 2003/0069024 A1* | 4/2003 | Kennedy, Jr. | H04W 64/00 |
| | | | 455/456.1 |
| 2010/0091611 A1* | 4/2010 | Laake | G01S 13/865 |
| | | | 367/38 |
| 2012/0072110 A1 | 3/2012 | Venkatraman | |
| 2012/0149388 A1* | 6/2012 | West | H04W 4/21 |
| | | | 455/456.1 |
| 2016/0047649 A1 | 2/2016 | Edge et al. | |
| 2017/0184405 A1* | 6/2017 | Rachuri | G01S 5/0263 |
| 2017/0219342 A1* | 8/2017 | Morioka | G01C 5/06 |
| 2017/0248428 A1* | 8/2017 | Oho | G01C 21/206 |
| 2018/0247568 A1* | 8/2018 | Wang | G09B 29/12 |

OTHER PUBLICATIONS

5G, "The Mobile Broadband Standard," 3GPP Specification Series, 36, 6 pages; [Retrieved on May 6, 2020] Retrieved from the Internet:<https://www3GPP.org/DynaReport/36-series.htm>.

5G, "The Mobile Broadband Standard," 3GPP Specification Series, 38, 3 pages; [Retrieved on May 6, 2020] Retrieved from the Internet: <https://www3GPP.org/DynaReport/38-series.htm>.

Xia, H., et al., "Using Multiple Barometers to Detect the Floor Location of Smart Phones with Built-in Barometric Sensors for Indoor Positioning," Sensors, ISSN 1424-8220, Switzerland, 2015, pp. 7857-7877.

* cited by examiner

TERMINAL DEVICE, INFRASTRUCTURE EQUIPMENT AND METHODS

CROSS-REFERENCE TO RELATED APPLICATIONS

The present application is based on PCT filing PCT/EP2018/080676, filed Nov. 8, 2018, which claims priority to EP 17201949.9, filed Nov. 15, 2017, the entire contents of each are incorporated herein by reference.

BACKGROUND

Field of the Disclosure

The present invention relates to a terminal device, infrastructure equipment and methods.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

Third and fourth generation mobile telecommunication systems, such as those based on the 3GPP ($3^{rd}$ Generation Partnership Project) defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

One requirement of future wireless communications networks is to be able to quickly and accurately determine the location of terminal devices of the wireless communication network so as to be able to provide location based services to those terminal devices. Although various methods of determining the location of a terminal device are known, such methods have their drawbacks. For example, when a terminal device is configured to determine its location using Global Navigation Satellite System (GNSS) signals or the like, the location determination can fail or be delayed when the terminal device is positioned so that receiving GNSS signals is difficult (e.g. if the terminal device is indoors or in an area with high rise buildings). There is therefore a need for further location determining methods to replace or work with existing methods for determining the location of terminal devices of wireless communications networks.

SUMMARY

The present technique is defined according to the claims.
The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
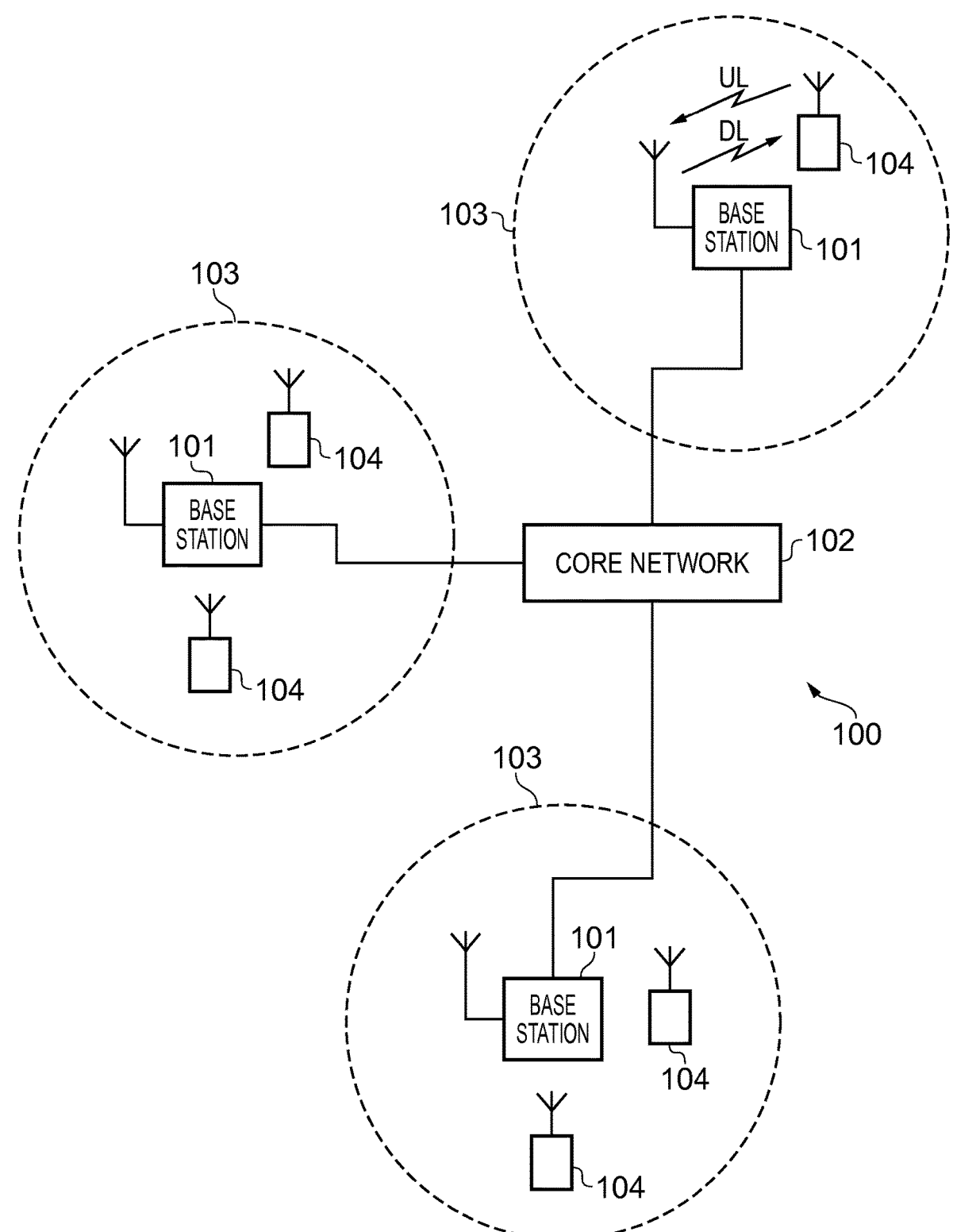
FIG. 1 provides a schematic diagram illustrating some basic functionality of a mobile telecommunications network/system.

Referring now to the drawings, wherein like reference numerals designate identical or corresponding parts throughout the several views.

FIG. 1 provides a schematic diagram illustrating some basic functionality of a mobile telecommunications network/system operating in accordance with LTE principles and which may be adapted to implement embodiments of the disclosure as described further below. It will be appreciated, however, that the use of LTE is only an example, and that the principles of the present disclosure may be applied to other types of wireless communications systems such as UMTS or NR (5G). Various elements of FIG. 1 and their respective modes of operation are well-known and defined in the relevant standards administered by the 3GPP® body, for example, 3GPP TS36 series [1] for LTE and 3GPP TS38 series for NR [2]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licensed for exclusive use by the operator of the network 100. The core network 102 routes data to and from the communications devices 104 via the respective base stations 101 and provides functions such as authentication, mobility management, charging and so on. A communications device may also be referred to as a mobile station, user equipment (UE), user device, mobile radio, terminal device, terminal and so forth. A base stations may also be referred to as a transceiver station, infrastructure equipment, NodeB (which is a UMTS base station), eNodeB (which is a LTE base station (eNB for short)), gNodeB (which is a NR base station (gNB for short)), and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Figure 2:
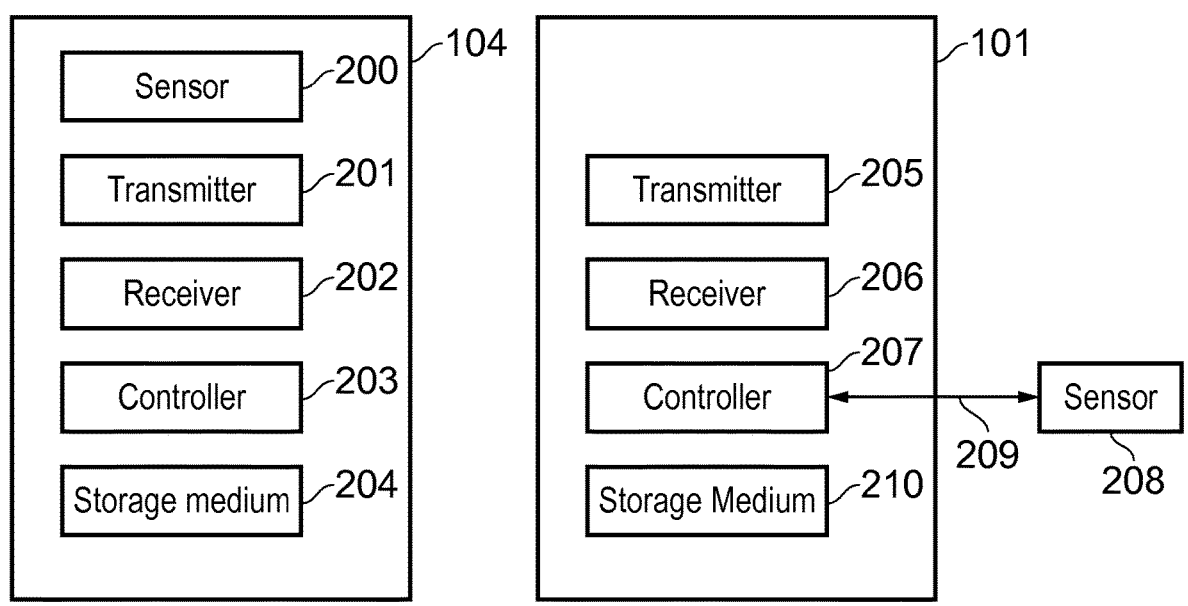
FIG. 2 schematically shows some components of a terminal device and infrastructure equipment according to an example embodiment.

FIG. 2 schematically shows some components of a UE 104 and a base station 101 according to an example embodiment.

The UE 104 comprises a sensor 200, a transmitter 201, a receiver 202, a controller 203 and a storage medium 204. The sensor 200 is for detecting a value of a parameter which is variable in response to a variation in vertical position of the UE 104. The transmitter 201 is for transmission of wireless signals (e.g. radio signals) to infrastructure equipment of the wireless telecommunications network. The receiver 202 is for reception of wireless signals (e.g. radio signals) from infrastructure equipment of the wireless telecommunications network. The storage medium 204 is for storage of digital data (and may take the form of solid state storage, for example). The controller 203 is configured to the sensor 200, transmitter 201, receiver 202 and storage medium 104 to operate in accordance with embodiments of the present disclosure. The controller 203 may comprise various sub-units for providing functionality in accordance with embodiments of the present disclosure as explained further below. These sub-units may be implemented as discrete hardware elements or as appropriately configured functions of the controller 203. The controller 203 may be suitably configured/programmed to provide the desired functionality described herein using conventional programming/configuration techniques for equipment in telecommunications systems. The sensor 200, transmitter 201, receiver 202, controller 203 and storage medium 104 are schematically shown in FIG. 2 as separate elements for ease of representation. However, it will be appreciated that the functionality of these elements can be provided in various different ways, for example using a single suitably programmed computer, or suitably configured application-specific integrated circuit(s)/circuitry. It will be appreciated that, although not shown, the UE 104 will in general comprise various other elements associated with its operating functionality, such as a user interface, battery, and the like. In the following embodiments, the sensor 200, transmitter 201, receiver 202 and controller 203 are implemented as circuitry. In particular, the functions of the controller 203 are carried out by processing circuitry comprised within the controller.

The base station 101 comprises a transmitter 205, a receiver 206, a controller 207 and a storage medium 210. The transmitter 205 is for transmission of wireless signals (e.g. radio signals) to a terminal device of the wireless telecommunications network. The receiver 204 is for reception of wireless signals (e.g. radio signals) from a terminal device of the wireless telecommunications network. The storage medium 210 is for storage of digital data (and may take the form of solid state storage, for example). The controller 207 is configured to control the transmitter 205, receiver 206 and storage medium 210 to operate in accordance with embodiments of the present disclosure. The controller 207 may comprise various sub-units for providing functionality in accordance with embodiments of the present disclosure as explained further below. These sub-units may be implemented as discrete hardware elements or as appropriately configured functions of the controller 207. The controller 207 may be suitably configured/programmed to provide the desired functionality described herein using conventional programming/configuration techniques for equipment in telecommunications systems. The transmitter 205, receiver 206, controller 207 and storage medium 210 are schematically shown in FIG. 2 as separate elements for ease of representation. However, it will be appreciated that the functionality of these elements can be provided in various different ways, for example using a single suitably programmed computer, or suitably configured application-specific integrated circuit(s)/circuitry. It will be appreciated that, although not shown, the base station 101 will in general comprise various other elements associated with its operating functionality. In the following embodiments, the transmitter 205, receiver 206 and controller 207 are implemented as circuitry. In particular, the functions of the controller 203 are carried out by processing circuitry comprised within the controller. In embodiments, the controller 203 is connected to a sensor 208 (provided in the form of circuitry, for example) via a suitable wired or wireless connection 209 which enables signals to be transmitted between the controller 203 and sensor 208. The sensor 208 is for detecting a reference value of the parameter detected by the sensor 200 of the UE 104. The reference value of the parameter detected by the sensor 200 is associated with a reference value of a vertical position, as will be explained.

In an embodiment of the UE 104, the sensor 200 is configured to detect a value of a parameter which is variable in response to a variation in vertical position of the UE 104. The receiver circuitry 202 is configured to receive, from the base station 101, a reference value of the parameter and a reference value of the vertical position at which the reference value of the parameter is associated, the reference value of the vertical position being defined relative to a first reference vertical position. The controller 203 is configured to determine a value of the vertical position of the UE 104 defined relative to a second reference vertical position. The determining comprises determining the second reference vertical position based on a geographical position of the UE 104, determining a value of the vertical position of the UE 104 defined relative to the first reference vertical position based on the detected value of the parameter, the reference value of the parameter, the reference value of the vertical position at which the reference value of the parameter is associated and a predetermined relationship between the variation in the value of the parameter and the variation in vertical position of the UE 104, and determining the value of the vertical position of the UE 104 defined relative to the second reference vertical position based on a difference between the determined value of the vertical position of the UE 104 defined relative to the first reference vertical position and the second reference vertical position. In an embodiment of the base station 101, the transmitter 205 is configured to transmit, to the UE 104, the reference value of the parameter detectable by the UE 104, the parameter being variable in response to a variation in vertical position of the UE 104, and the reference value of the vertical position at which the reference value of the parameter is associated, the reference value of the vertical position being defined relative to the first reference vertical position. In an embodiment, the reference value of the parameter detectable by the UE 104 (in particular, by the sensor 200) is detected by the sensor 208 connected to the controller 207 of the base station 101.

A further discussion of the present technique is now provided.

It is known that GPS (Global Positioning System), which is one type of GNSS (Global Navigation Satellite System) and is owned and operated by the US, became popular with navigation systems for vehicle as a commercial use. Nowadays, many UEs such as smartphones are equipped with a GPS module and many applications which use GPS to determine the UEs location are available in addition to traditional navigation applications. Such applications enable a vast array of location based services to be implemented, such as exercise tracking (e.g. tracking a user as they run or cycle), location relevant advertisements (e.g. pushing advertisements to UEs relating to businesses in the local area of the UE), location relevant social media applications (e.g. allowing a user of a UE to know when friends or colleagues are nearby) and the like.

A UEs location is therefore valuable information and, in addition to GPS, various regional GNSSs such as GLONASS (Globalnaya Navigatsionnaya Sputnikovaya Sistema) in Russia, Galileo in the European Union (EU), BeiDou in China and others are now available. Furthermore as the development Advanced Driver Assistance System (ADAS) and autonomous driving is gaining traction in the vehicle industry and as Unmanned Airborne Vehicle (UAV) technology is expected to bring innovation to various industries such as package delivery, surveying and so on, improvement of the accuracy of determining UE location is a topic of considerable interest to organisation such as 3GPP. In particular, it is a topic gaining much interest in the context of 5G (5$^{th}$ Generation)/NR (New Radio) technology.

Generally speaking, GPS provides approximately 10 m order accuracy under good receiving condition of signals from satellites. On the other hand, as most GPS terminals are assumed to move between different positions at ground level, it is possible to provide improved accuracy of a UEs horizontal position on the ground (e.g. defined in terms of longitude and latitude) at the cost of reduced the accuracy in the vertical position of the UE relative to the surface of the earth (e.g. defined in terms of altitude). Since, until now, the most popular application of UE positioning technology related to navigation of ground-based vehicles), such a reduction in vertical position accuracy did not cause many problems. However, the recent development of UAV, ADAS and industrial IoT (Internet of Things) generally require high accuracy in the determination of vertical position as well as horizontal position.

Newer UEs such as smartphones and smartwatches are often equipped with additional sensors such as a barometer for measuring atmospheric pressure (ambient pressure). It has been envisaged that such additional sensors may help in determining the position of a UE (in particular, the vertical position) more accurately. For example, with a barometer, as well as being able to monitor pressure information for weather forecasting or the like, it is envisaged that the measurement of altitude provided by a barometer (based on the fact that atmospheric pressure changes in dependence on altitude) may allow the vertical position of a UE to be determined more accurately. For example, some recent products are available which can detect a difference in atmospheric pressure corresponding to a difference in altitude of 5 cm as a measurement accuracy.

In light of these recent developments, embodiments of the present technique allow more accurate determination of a UE vertical position by combining data from a sensor such as a barometer with data such as traditional GNSS data.

As described above, there is a requirement for new types of UE to support the needs of UAV, ADAS and industrial IoT in allowing more accurate UE positioning than is conventionally available using GNSS. As well as more accurate horizontal positioning such as latitude and longitude being desirable, more accurate vertical position such as altitude is particularly desirable for such applications. The present technique provides improved vertical positioning, particularly in comparison to conventional vertical positioning using GNSS.

Figure 3:
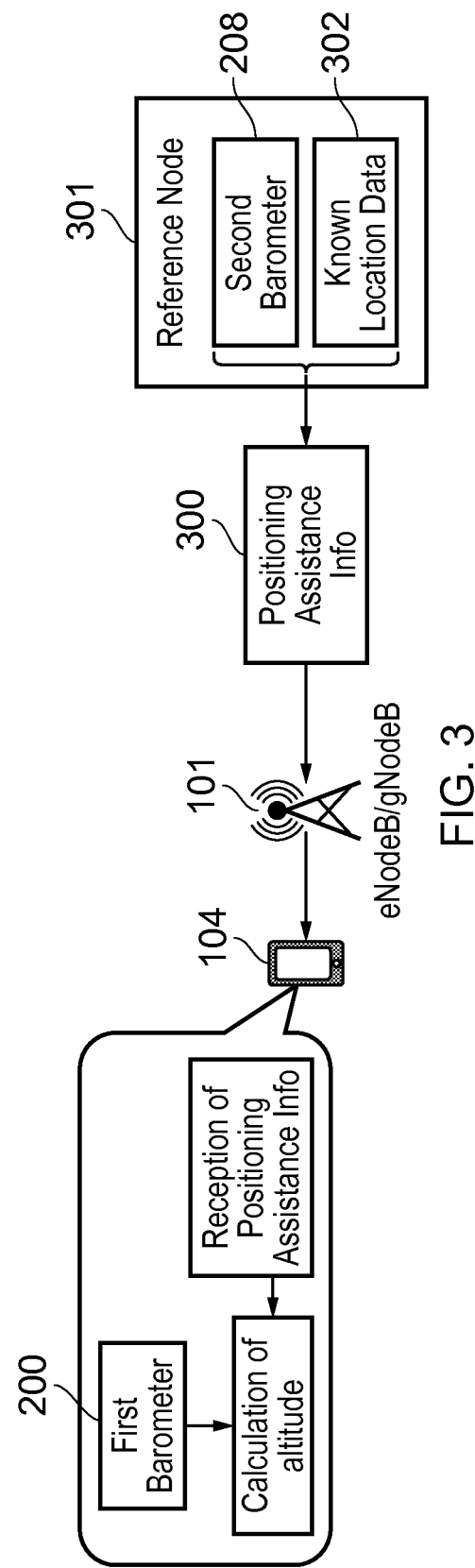
FIG. 3 schematically shows a first embodiment of a terminal device according to the present technique.

An embodiment of the UE 104 of the present technique which allows more accurate determination of an altitude of the UE 104 is shown in FIG. 3. Positioning assistance information 300 is provided to the UE by the eNodeB/gNodeB 103. The positioning assistance information 300 comprises a reference value of a parameter which is variable in response to a variation in vertical position of the terminal device (e.g. reference pressure as measured by a barometer, the barometer being an example of sensor 208) and a reference value of the vertical position at which the reference value of the parameter is associated (e.g. the altitude of the barometer which measures the reference pressure). An example of positioning assistance information associated with a barometer is shown in Table 1.

TABLE 1

| Parameter name | items | Unit |
| --- | --- | --- |
| reference location info | ID number | index number |
| | longitude | degree |
| | latitude | degree |
| | coordination system | selection e.g. WGS84 |
| | elevation | m from sea level |
| Measured values | temperature | degree Celsius |
| | barometer value | hPa |
| Validity info | Measured timestamp | time/date |
| | expired time/date | time/date or timer value |
| | next planned update time | time/date |
| | validity area/cell radius | m (from the centre of cell) |

The UE 104 receives the Positioning Assistance Info 300 via the eNodeB/gNodeB 101 and calculates an altitude of the UE 102 using the said Positioning Assistance Info 300 and a value measured by a first barometer which is equipped as part of the UE 104 (in this case, the sensor 200 is the first barometer). Here the Positioning Assistance Info 300 includes a value measured by a second, reference barometer (in this case, the sensor 208 is the second barometer) which is equipped as part of a reference node 301 and location data 302 including information on the altitude of the reference node 301 at which the reference barometer is located. This allows the altitude of the UE 102 to be calculated relative to the altitude to the reference node 301. This is possible because, if a pressure value at a point on each of two isobaric surfaces, the difference of altitude of those points can be calculated with the hypsometric equation, for example. The hypsometric equation represents a predetermined relationship between a variation in pressure and a variation in altitude. The hypsometric equation is a known equation in the field of physics, and is therefore not discussed in detail here.

In this example, the reference node 301 may be stationary to so as to be maintained as an accurate reference point. Furthermore, the positioning assistance information (Positioning Assistance Info) 300 can be updated depending on a variation of the value measured by the second barometer 208 so as to account for changes in pressure at the fixed horizontal position resulting from environmental conditions such as the weather or the like.

The provision of the Positioning Assistance Info 300 (and/or any updates) to the UE 104 can be carried out via any suitable technique for transmitting data from the base station 101 to the UE 104. In one example, the Positioning Assistance Info may be transmitted in a system information block (SIB), in particular, an on-demand SIB (e.g. in the way as described in European patent application EP17199204.3). The way in which the Positioning Assistance Info 300 is provided may depend on a service which the UE 104 selects among a plurality of services (e.g. the service may specify one of broadcast, group cast or unicast for delivering the Positioning Assistance Info 300) and/or on a type of the UE 104 (e.g. UE category, class or capability, the type of the UE 104 indicating the type of service(s) via which the UE 104 may receive the Positioning Assistance Info 300). Here, each service may be provided based on a concept of Network Slicing. If the Positioning Assistance Info 300 is broadcast, then this may be broadcast (e.g. in a SIB) without any request by any particular UE) or may be broadcast in response to a request from a particular UE (e.g. in an on-demand SIB). Legacy LTE Positioning Protocol (LLP) may be used (with any suitable enhancements) in order to deliver the Positioning Assistance Info 300 to the UE 104.

The Positioning Assistance Info 300 may comprise data generated by the barometer 208 in addition to GNSS positioning assistance information. Furthermore the reference node 301 can be co-located with the eNodeB/gNodeB 101. In this case, the location data 302 and any other data used by the reference node 301 in generating the Position Assistance Info 300 may be stored in the storage medium 210 of the eNodeB/gNodeB, for example.

The frequency (that is, how often) that the positioning assistance information 300 (including the altitude of the reference node 301, pressure as measured by the second barometer 208 and GNSS assistance information) is updated may be adjusted depending on one or more predetermined conditions, e.g. depending on conditions of the weather or the like (it is known that changing whether conditions can cause changes in pressure at a particular altitude). Furthermore, the updating of the positioning assistance information 300 may be triggered depending on values measured by the second barometer 208. For example, an update may be triggered in the case that a difference of the latest measured value of the barometer 208 and the previously measured value of the barometer 208 is more than a certain threshold. This threshold may be chosen depending on the size of wireless coverage area of the eNodeB/gNodeB 101 or estimated valid area information provided by the reference node 301. Here, in the case that the reference node 301 is co-located with the base station 101, the valid area can be defined as a wireless coverage area of the eNodeB/gNodeB 101 based on one or more of transmission power, frequency band, cell ID or the like. In the case that a plurality of reference nodes 301 exist in the cell associated with a particular eNodeB/gNodeB, the valid area can be segmented over the wireless coverage area of the eNodeB/gNodeB depending on the location of each reference node 301. In embodiments, the number of reference nodes 301 in the cell should be set on an area-by-area basis so that errors due to differences in the ambient pressure at a particular altitude between the position of the relevant reference node 301 and UE 104 is within an acceptable tolerance (environmental conditions means that the reference pressure at a given altitude may be different at different locations). The term "valid area" should be understood to mean a geographical region (in particular, a horizontally defined geographical region, e.g. as defined by a boundary defined by longitude and latitude coordinates) in which the positioning assistance information is valid for determining the altitude of the UE 104.

In the case that the positioning assistance information is provided via on-demand SI (system information) (e.g. in an on-demand SIB), a valid duration for the positioning assistance information 300 (that is, a time period for which the positioning assistance information 300 is valid) or frequency for updating the positioning assistance information (that is, how often the positioning assistance information 300 is to be updated) can be configured by the UE 104 in conjunction with the provision of the on-demand SI.

In one example, the UE 104, upon receiving the positioning assistance information, the UE 104 (e.g. the controller 203) starts a timer and, when the valid duration has expired (according to the timer), the UE 104 can issue another on-demand SI request for obtaining new on-demand SI comprising updated positioning assistance information. The valid duration may be preconfigured at the UE 104 (e.g. data indicative of the valid duration may be stored in the storage medium of the UE 104 in advance) or may be received as part of the positioning assistance information, for example. In the case that the valid duration is updateable (e.g. if it is received as part of the positioning assistance information), the valid duration can be configured in accordance with a prediction of upcoming differences in atmospheric pressure based on weather information or the like. Thus, for example, if it is known from weather information that the atmospheric pressure is likely to undergo more and/or larger changes over a certain upcoming time period, then the valid duration may be reduced so that the positioning assistance information is updated more often. This helps to ensure that the vertical position of the UE 104 may be accurately determined even when atmospheric pressure is subject to a greater number of and/or larger changes. On the other hand, if it is known from weather information that the atmospheric pressure is likely to undergo less and/or smaller changes over a certain upcoming time period, then the valid duration may be increased so that the positioning assistance information is updated less often. This helps to reduce power consumption of the UE 104. It will also be appreciated that the valid duration may be adjusted depending on any other suitable factor. In a further example, different types of UE 104 and/or different types of service provided to the UE 104 by the network may be associated with different predetermined accuracies (these may be referred to as accuracy classes). For each accuracy class, there is a different respective valid duration. In particular, the more accurate a particular accuracy class, the shorter the valid duration is, and the less accurate a particular accuracy class, the longer the valid duration is. The UE 104 may select a suitable accuracy class depending on the UE category (or UE type), capability, application which the UE is using or the like.

In an embodiment, a positioning function (operating in accordance with the principles described above, for example) is independent of a cellular function of the UE 104. For example, the UE 104 may be configured to measure its position via the positioning function during even an inactive state of a discontinuous reception and/or transmission function such as DRX (Discontinuous Reception) or eDRX (Extended Discontinuous Reception) in which the conventional cellular function of the UE 104 is turned off. In this case, the valid duration of assistance information may be synchronized to an inactive duration of DRX (or eDRX) so that updated positioning assistance information (which may be broadcast or which may be received as part of on-demand SI requested by the UE) is only received during an active duration of DRX. It is noted that, in a discontinuous reception and/or transmission mode such as DRX or eDRX, during each of a plurality of first successive time periods (each of these being an "active" duration), the terminal device is configured to transmit predetermined data to and/or receive predetermined data from (e.g. data relating to the conventional cellular function of the UE 104) the infrastructure equipment. During each of a plurality of second successive time periods (each of these being an "inactive" duration), the terminal device is configured to not transmit the predetermined data to and/or receive the predetermined data from the infrastructure equipment. In an embodiment, the first successive time periods are interleaved between the second successive time periods so as to provide alternating "active" and "inactive" states of the UE 104. In an embodiment of the present technique, the length of each of the second successive time periods (this being the "inactive" duration) is synchronised with the valid duration of the assistance information (so that updated positioning assistance information is only received during an "active" duration). For example, the valid duration of the positioning assistance information 300 may be equal to the "inactive" duration and may be configured to start and end at the same time as each of the "inactive" durations.

If the UE 102 is prioritized to monitor its altitude out of a plurality of parameters (each parameter being measurable using an appropriate sensor), the UE 104 can be configured with a dedicated discontinuous reception and/or transmission mode for the altitude (that is, the length of the active and inactive durations of the discontinuous reception and/or transmission mode are chosen in accordance with how often position assistance information should be updated so as to enable accurate vertical positioning of the UE 104 based on the monitored altitude. More generally, the length of each of active and inactive durations may be determined in accordance with a characteristic of the parameter measured by the sensors 200 and 208 (whether this parameter is pressure (as measured by a barometer) or another parameter). Discontinuous reception and/or transmission modes such as eDRX enable such active/inactive duration settings which differ from the general active/inactive duration settings configured for a UE 104. In one example, when vertical positioning via the parameter measured by sensors 200 and 208 is turned on, the active/inactive duration settings may be applied so as to overall the general active/inactive duration settings. On the other hand, when this vertical position is turned off, the active/inactive duration settings may return to the general active/inactive settings.

In general, the UE 104 may be configured to receive updated positioning assistance information via the system information in accordance with a timing of cell selection/reselection in idle mode. However, it may be further desirable for the UE 104 to measure its position during an inactive state/mode of its conventional cellular function in order to reduce power consumption. For this purpose, the valid area for positioning assistance information (that is, the geographical region over which the positioning assistance information is valid) may be defined on a coordinate-basis (e.g. based on latitude and longitude or the like) rather than on a unit of cell. In this case, the UE 104 does not always need to perform cell selection/reselection at the boundary between cells during an inactive state/mode of its conventional cellular function. In particular, if the UE 104 moves to a new cell but is still within a valid area for the positioning assistance information currently held by the UE 104, then cell selection/reselection does not have to be performed (since updated positioning assistance information is not yet needed). Power consumption of the UE 104 is thus reduced.

In this case, if the positioning function of the UE 104 detects that the UE is about to leave a valid area, then the positioning function may instruct the cellular function to request an update of the positioning assistance information. If necessary, the UE 104 would release any running discontinuous reception and/or transmission mode (e.g. eDRX) so as to be able to receive system information including the updated positioning assistance information (that is, the movement of the UE to a new valid area associated with different positioning assistance information results in action being taken by the UE to receive updating positioning assistance information, even if the current discontinuous reception and/or transmission mode is currently in an "inactive" state in which, during normal operation, updated positioning assistance information would not be sought). Furthermore, in the case that the positioning assistance information is provided via on-demand system information, the UE 104 will transition to a states in which it is able to send the request for updated on-demand system information.

Figure 4:
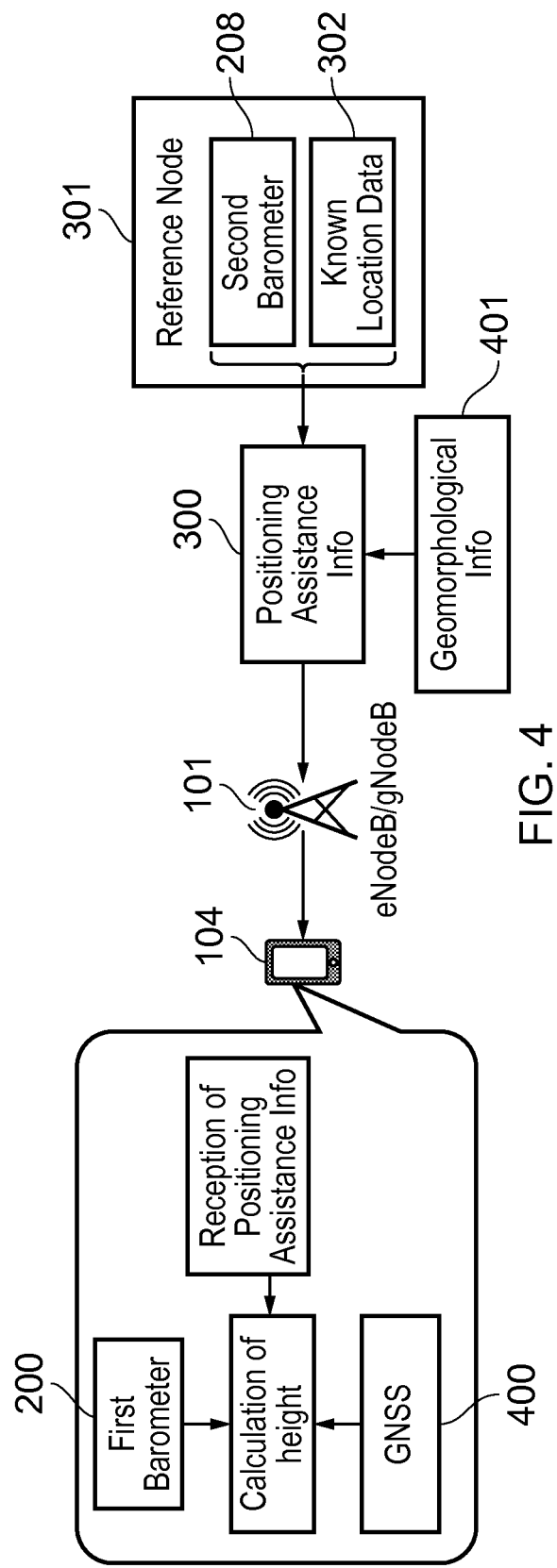
FIG. 4 schematically shows a second embodiment of a terminal device according to the present technique.

In recent years, there has been an enlarging interest in UAVs such as drones and the like. For such applications, it is not only the accuracy of the vertical position which is important, but also how the vertical position is defined relative to geomorphological characteristics of the surface of the earth (including land and/or bodies of water such as lakes, rivers, seas or the like) over which the UAV is travelling. In light of this, FIG. 4 shows an embodiment of the present technique. The arrangement of FIG. 4 is based on that of FIG. 3, and thus, for the sake of brevity, features already described with reference to FIG. 3 are not described again.

The arrangement of FIG. 4 is of particular relevance to UAVs such as drones and the like. It is often beneficial for such UAVs to determine their vertical position (which may be referred to as altitude) relative to ground level rather than relative to a standardised reference point for vertical position such as sea level (vertical position defined relative to sea level may be referred to as "absolute altitude". In this description, the term "altitude" may be used interchangeably with the term "vertical position". In the case of acquiring the altitude of a UE 104 comprised within a UAV relative to ground level, in an embodiment, it is necessary to know the altitude of the ground level at the horizontal position (e.g. defined by latitude and longitude) of the UE 204. Like the absolute altitude, the altitude of the ground level may be defined relative to sea level (such an altitude may be referred to as ground "elevation").

In order to determine the ground elevation, the Positioning Assistance Info 300 can further include geomorphological information 401 such as a 3D map or the like. The geomorphological information 401 (such as a 3D map) provides a mapping between the horizontal position of the UE 104 (e.g. defined by longitude and latitude) and the ground elevation of the surface of the earth at that horizontal position. To calculate the altitude of the UE 104 relative to ground level, the difference between the determined altitude of the UE relative to sea level (in the case that the reference altitude of the reference node 203 is defined relative to sea level) and the ground elevation at the horizontal position of the UE 104 is determined by the controller 203. More generally, it will be appreciated that sea level is an example of a first reference vertical position for determining the altitude of the UE 104 and ground level is an example of a second reference vertical position for determining the altitude of the UE 104. Thus, for example, if the UE 104 calculates its vertical position relative to sea level (as a first reference vertical position) as 10 m and the ground elevation at its horizontal location as 4 m, then the vertical position of the UE 104 relative to ground level (as a second reference vertical position) is 10 m–4 m=6 m. The UE 104 is able to determine its vertical position based on received GNSS information 400 or (as will be explained later on) signals transmitted from one or more other beacon signal emitting devices (such as a WiFi® beacon or the like) at known positions, for example.

It will be appreciated that the first and second reference vertical positions may be vertical positions other than sea level and ground elevation, respectively. In particular, the first vertical reference position may be any chosen vertical reference position with respect to which the vertical position of objects can be calculated and compared. The second vertical reference position may then be the vertical position (relative to the first vertical reference position) of an object on the earth's surface which varies with the geographical location of the UE 104. For example, the second vertical reference position may be the height of buildings, rooftops or the like. In this case, the height of buildings, rooftops of the like may be provided with geomorphological information available for use by the UE 104, for example. In this case, for example, the ground elevation provided by the geomorphological information may take into account the height of buildings, so that the ground elevation at the geographical position of a building is the height of the building at that geographical position rather than the height of the ground that the building is built on at the geographical position. Alternatively, for example, additional information indicative of the height of buildings relative to ground elevation may be included with the geomorphological information. In this case, the second reference vertical position at a particular geographical position is obtained by the sum of the ground elevation and the building height relative to ground elevation at that particular geographical position.

The UE 104 is thus configured to calculate its altitude relative to the altitude of the reference node 301 using the values measured by the first barometer 200 of the UE 104 and the second barometer 208 of the reference node 301. The UE 104 is then able to determine its absolute altitude using the reference altitude (defined as an absolute altitude) of the reference node 301. In particular, the sum of the reference altitude and altitude of the UE 104 relative to the reference altitude provides the absolute altitude of the UE 104. The geomorphological information (indicating the ground elevation at each of a plurality of horizontally defined points on the earth's surface) and horizontal position of the UE 104 (as measured using GNSS or the like) are then used to determine the ground elevation at the horizontal position of the UE 104. Finally, the difference between the absolute altitude of the UE 104 and the ground elevation at the horizontal position of the UE 104 is determined so as to determine the vertical position of the UE 104 relative to ground level.

Figure 5:
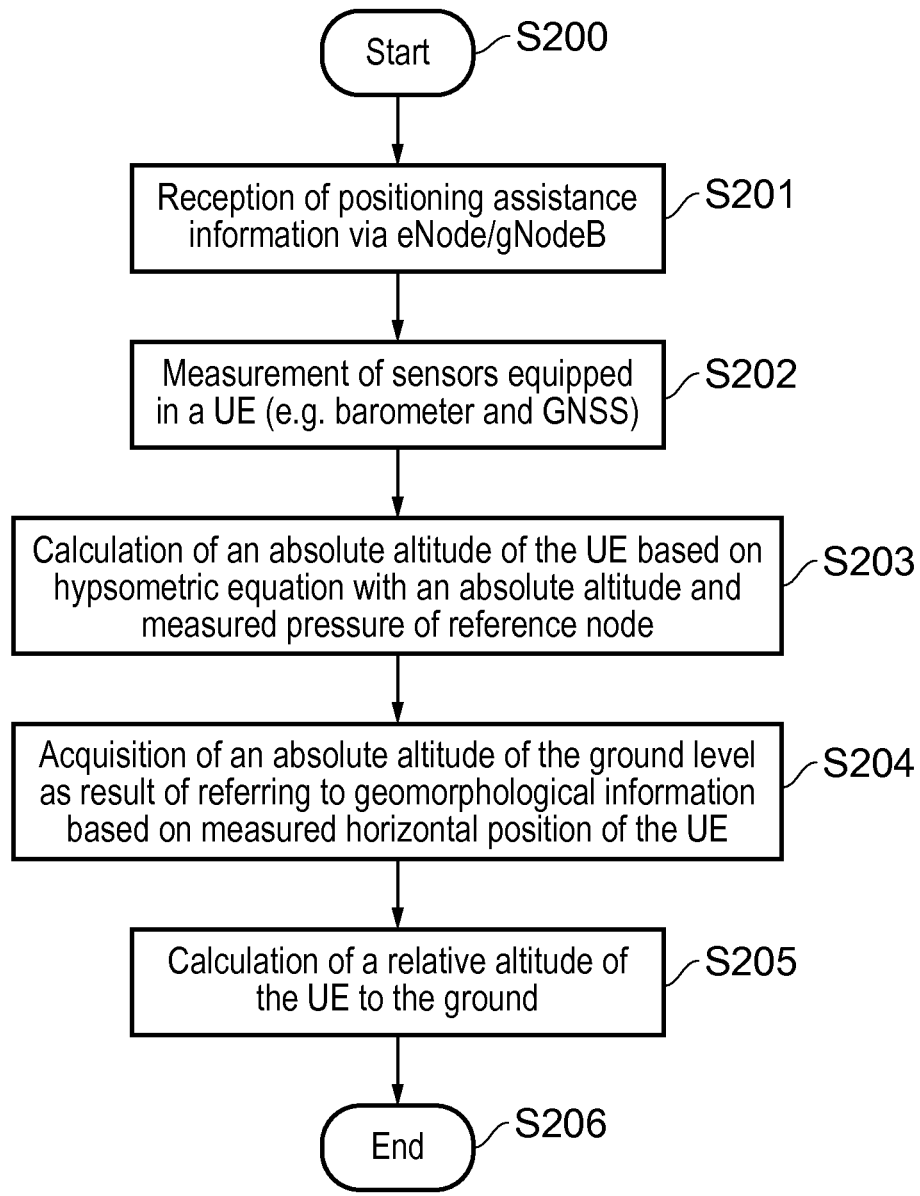
FIG. 5 schematically shows a process carried out by a terminal device, according to an embodiment.

An example of a process for calculating the altitude of the UE 104 relative to the ground elevation is shown in FIG. 5. The process starts at step S200. At step S201, the Positioning Assistance Info 203 is received by the UE 104 via the eNodeB/gNodeB 101. Subsequently, at step S202, the UE 104 measures its horizontal position (e.g. latitude and longitude) using GNSS or the like and the atmospheric pressure using the first barometer 200. It will be appreciated that the order of S201 and S202 may be switched. Next, at step S203, the UE 104 calculates its absolute altitude (i.e. relative to sea level) based on the hypsometric equation and the absolute altitude and measured atmospheric pressure of the reference node 301. This information relating to the reference node 301 is included in the Positioning Assistance Info 203. At step S204, the UE 104 receives geomorphological information 401 via the eNodeB/gNodeB 101 and determines an absolute altitude of the ground level at the horizontal position of the UE 101 measured at S202 via the geomorphological information 401. This geomorphological information 401 may be provided together with or in the Positioning Assistance Info 203 or provided separately from the Positioning Assistance Info 203 using a different frequency and/or method. Such a different method may include provision of the geomorphological information via different system information, via user plane or the like. The received geomorphological information 401 is stored in the storage medium 204. It will also be appreciated that the geomorphological information may be stored in the storage medium 204 in advance (e.g. during manufacture of the UE 104). At step S205, the UE 104 then calculates its altitude relative to the ground level using the absolute altitude (from S203) and the absolute altitude of the ground level (from S204). The process then ends at step S206. In embodiments, the geomorphological information may comprise a precise map such as a 3-dimensional (3D) map or may comprise simpler information such as geomorphological gradient indicating a difference in ground elevation between the ground elevation of the reference node and the ground elevation at one or more positions other than the reference node. For example, the geomorphological gradient may define that, in a given direction starting from the position of the reference node, the gradient is x (e.g. x metres change in elevation per metre of horizontal movement in the given direction). Depending on the distance d along the given direction at which the UE 104 is located, the ground elevation at the UE's position will therefore be the reference altitude+x*d.

The geomorphological information 401 can be preconfigured in the reference node 301 (e.g. stored in the storage medium 210 when the reference node is co-located with the base station 101 or, in the case that the reference node 301 is not co-located with the base station 101, in another storage medium (not shown) comprised as part of the reference node 301) or at another entity configured to exchange data with the network 100 (such as a location server (not shown)). As mentioned above, wherever in the network the geomorphological information is stored, it may be transmitted to the UE 104 by the eNodeB/gNodeB 101. A portion of the total amount of geomorphological information available may be provided to the UE 104 by the eNodeB/gNodeB 101 depending on the wireless coverage area of the eNodeB/gNodeB 101, for example. This reduces the amount of data that needs to be transmitted (compared to transmitting all the geomorphological information), thus helping to reduce network overhead. In the case of using a plurality of TRPs (Transmission/Reception Points) for allowing connection of the UE 104 to the network 100, the portion of geomorphological information provided may include sub-portions corresponding to the wireless coverage area associated with each TRP. In this case, one TRP (e.g. an eNodeB/gNodeB) may transmit the relevant geomorphological information for all TRPs.

Figure 6:
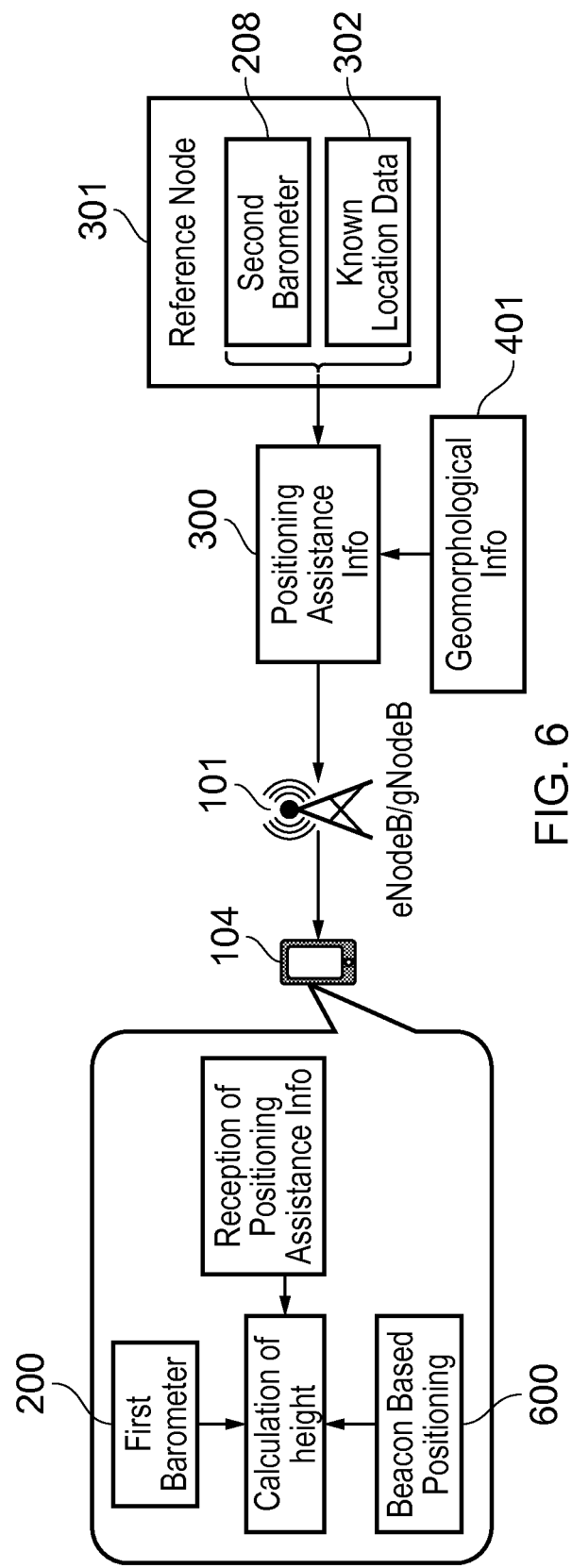
FIG. 6 schematically shows a third embodiment of a terminal device according to the present technique.

Another embodiment for determining the altitude of the UE 104 relative to ground level is described with reference to FIG. 6. The arrangement of FIG. 6 is based on that of FIG. 4, and thus, for the sake of brevity, features already described with reference to FIG. 4 are not described again. It is noted that compared to FIG. 4, GNSS information 400 has been replaced with beacon based positioning information 600.

The embodiment of FIG. 4 allows the UE 104 to detect its altitude relative to ground level under conditions in which the UE 104 is able to detect its horizontal position via GNSS signals. However, the UE 104 may not always be located such that it is able to detect GNSS signals (e.g. if the UE 104 is indoors or in an urban area with many high rise buildings). Thus, in the embodiment of FIG. 6, beacon based positioning may be used instead. Beacon based positioning (such as Terrestrial Beacon System (TBS) or the like) makes use of one or more beacon signal emitting devices whose respective locations are known. Beacon signals emitted by each of the devices are detected and a characteristic (e.g. signal strength or signal quality) of each beacon signal is measured by the UE 104 so as to determine the UE's distance from each beacon signal emitting device. The UE 104 is then able to determine its absolute location in a given coordinate system based on knowledge of the location of each of the beacon signal emitting devices in that coordinate system. It is know that location determination by a UE 104 using beacon signalling may be implemented by Bluetooth® Low Energy beacon signals, WiFi® beacon signals or the like.

In an embodiment, the UE 101 or another network entity such as a location server has location information such as the latitude, longitude and altitude of each beacon signal emitting device (such devices may referred to as a "beacon") mapped to an ID of each beacon. It is noted, however, that current uses of beacon signalling are not intended for allowing accurate UE location information such as latitude, longitude and altitude, but, rather, are intended for determining the proximity of a UE to a particular premises equipped with a beacon so as to provide information and/or advertisement content related to the premises to the UE (e.g. in a push manner). Thus, in addition to the use of beacon signalling, other positioning technology such as GNSS or the like may be used to allow the location server (or other network entity) to have approximate positioning information corresponding to the ID of each beacon. For example, the location server may determine the most recent position of the UE 104 as measured using GNSS signals when the UE 104 was also within range of a beacon signal emitting from a particular beacon (that is, a beacon with a particular ID identifying that beacon). The most recent position of the UE 104 as determined by the GNSS signals is then associated with an ID (identifier) of that beacon, thus allowing the position of the beacon to be approximated. Thus, at a later point, even if the UE 104 is not within range to receive GNSS signals of sufficient quality and/or strength, positioning of the UE 104 can still be carried out if beacon signals are received from the beacon whose ID has been associated with a particular position. The location of each beacon may be determined more accurately by repeating this process (that is, associating each beacon ID with the GNSS determined position of a UE) for a plurality of UEs. The average position (in particular, horizontal position measured by e.g. latitude and longitude) determined by each UE may then be associated with that beacon ID. The position of a particular beacon may therefore be determined more accurately over time. It is noted that, in an embodiment, rather than measuring a particular characteristic of a beacon signal (e.g. signal strength and/or signal quality) in order to determine a UE's proximity with respect to the beacon emitting that signal, the detection of the beacon signal (which comprises the beacon ID of the beacon emitting that signal) may be used to determine simply that the UE is within range of that beacon. If the beacon's position is known, then the UE's position may be determined to be the same as that of the beacon. This enables an approximate position of the UE to be determined without the need for measurements to be performed on the beacon signals, thus reducing the processing required. Due to the small distance over which the UE is able to receive beacon signals (e.g. via Wi-Fi® or Bluetooth® Low Energy), the position of a beacon whose signals are received by the UE is a good approximation for the position of the UE itself.

It is envisaged (based on e.g. a known feature of the Android® operating system in which a Network Location Provider for determining a UE's current location is specified as one which uses Wi-Fi® beacons) that an accuracy of the order of tens of metres for the approximate position of a UE may be achieved by determining the position of the UE as equal to the position of a particular beacon. Such accuracy over in the horizontal position will in many cases be enough for determining the altitude relative to ground level using the first barometer 200, a second barometer 208, absolute altitude of the reference node 301 and a geomorphological information (Geomorphological Info) 401 (in particular, when the rate of change of ground level at the UE's position is smaller). In this case, the Geomorphological Info 401 comprises the ground elevation at the horizontal position of the beacon concerned. Furthermore, if the Geomorphological Info 401 comprises the ground elevation at the horizontal position of each of a plurality of beacons, and the UE 104 is able to detect a beacon signal from each of those plurality of beacons, then a more accurate determination of the horizontal position (e.g. based on triangulation of the beacon signals) may be determined. A more accurate altitude may therefore be determined at the more accurately determined horizontal position of the UE 104 (provided that the Geomorphological Info 401 includes the ground elevation at the more accurately determined position of the UE 104). In the described embodiments of FIG. 6, it is noted that the Beacon Based Positioning Information 600 comprises the signal received from each beacon. Furthermore, the geomorphological information 401 comprising the ground elevation at the horizontal position of each of one or more beacons may be configured as previously described for the geomorphological information 401 described with reference to FIGS. 4 and 5.

In embodiments, the required accuracy of the determined UE altitude may depend on the UE. For example, for some of UEs which require a determined altitude of lower accuracy, the determined altitude, atmospheric pressure and horizontal position of other UEs (the altitude having been determined for these other UEs using one of the above-described embodiments) may be used by the UE concerned in order to determine its altitude. In this case, the other UEs act as additional reference nodes 301. In such cases, a location server (or other suitable network entity) may collect the determined altitude, atmospheric pressure and horizontal position of each of the other UEs and provide these as part of the Positioning Assistance Info 300 to UEs which require a lower accuracy altitude. In this case, if the determined altitude provided for each of the other UEs is relative to ground level, then the UEs which use this information do not even need to know the Geomorphological Info 401. The processing required at these UEs is therefore reduced. The accuracy of the altitude required for each UE may be known by the network based on a predetermined category of each UE, for example (e.g. two categories, one for higher accuracy (using only stationary reference nodes 301) and one for lower accuracy (which may use other UEs as reference nodes, referred to as movable reference nodes)). Positioning Assistance Info 300 transmitted by a stationary reference node 301 or UE may indicate the category of node which transmits the Positioning Assistance Info 300 (i.e. indicating either "stationary" when transmitted by a stationary reference node 301 or "moving" when transmitted by a UE). A particular UE using the Positioning Assistance Info 300 for positioning will then only use Positioning Assistance Info 300 transmitted from a source which matches the category of that UE. Thus, for example, a high accuracy UE may be configured such that it is only able to use Positioning Assistance Info 300 from stationary reference nodes (indicated as "stationary" in the Positioning Assistance Info signal) whereas a low accuracy UE may be configured such that it is able to user both Positioning Assistance Info 300 from stationary reference nodes (indicated as "stationary" in the Positioning Assistance Info signal) and Positioning Assistance Info 300 from moving reference nodes (e.g. UEs) (indicated as "moving" in the Positioning Assistance Info signal). It will be appreciated that the category included in the Positioning Assistance Info 300 is an example of data indicative of the accuracy reference value and/or reference altitude included in the Positioning Assistance Info 300.

It is noted that UEs in vehicles (e.g. as used for allowing autonomously controlled vehicles) are a good example of UE's which require high accuracy in their positioning but which may be suitable for use as reference nodes for other, low accuracy UEs. In such cases, the determined altitude relative to ground level for such vehicles means that a UE which uses UEs comprised within such vehicles as reference nodes does not need to be provided with Geomorphological Info 401 in order for that UE's altitude relative to ground level to be determined.

Figure 7:
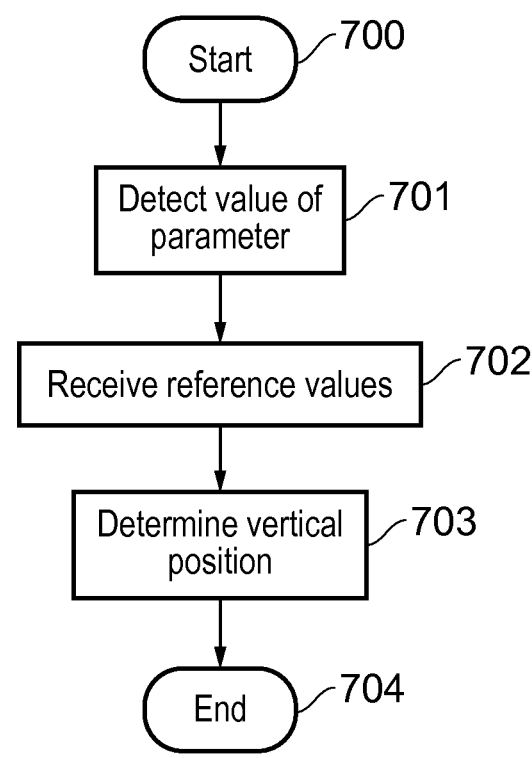
FIG. 7 schematically shows a generalised process carried out by a terminal device, according to an embodiment.

FIG. 7 schematically shows a method of operating the UE 104, according to an embodiment of the present technique. The method is carried out by processing circuitry of the controller 203, for example. The method starts at step 700. At step 701, the sensor 200 is controlled to detect a value of a parameter which is variable in response to a variation in vertical position of the UE 104. At step 702, the receiver 202 is controlled to receive, from the base station 101, a reference value of the parameter and a reference value of the vertical position at which the reference value of the parameter is associated, the reference value of the vertical position being defined relative to a first reference vertical position. At step 703, a value of the vertical position of the UE 104 defined relative to a second reference vertical position is determined. The determining comprises determining the second reference vertical position based on a geographical position of the UE 104. A value of the vertical position of the UE 104 defined relative to the first reference vertical position is then determined based on the detected value of the parameter, the reference value of the parameter, the reference value of the vertical position at which the reference value of the parameter is associated and a predetermined relationship between the variation in the value of the parameter and the variation in vertical position of the UE 104. The value of the vertical position of the UE 104 defined relative to the second reference vertical position is then determined based on a difference between the determined value of the vertical position of the UE 104 defined relative to the first reference vertical position and the second reference vertical position. The process then ends at step 704.

Figure 8:
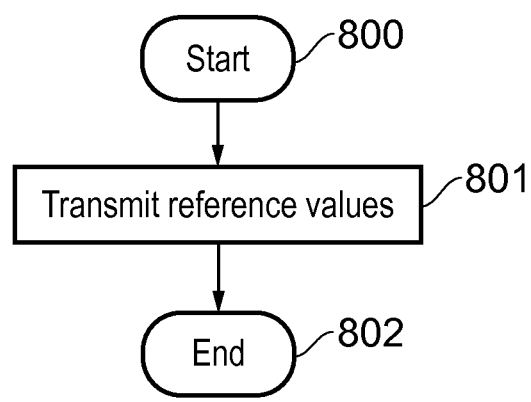
FIG. 8 schematically shows a generalised process carried out by infrastructure equipment, according to an embodiment.

FIG. 8 schematically shows a method of operating the base station 101, according to an embodiment of the present technique. The method is carried out by processing circuitry of the controller 207, for example. The method starts at step 800. At step 801, the transmitter 205 is controlled to transmit, to the UE 104, a reference value of a parameter detectable by the UE 104, the parameter being variable in response to a variation in vertical position of the UE 104, and a reference value of the vertical position at which the reference value of the parameter is associated, the reference value of the vertical position being defined relative to a first reference vertical position. A value of the vertical position of the UE 104 defined relative to a second reference vertical position is then determined by the UE 104. The determining comprises determining the second reference vertical position based on a geographical position of the UE 104. A value of the vertical position of the UE 104 defined relative to the first reference vertical position is then determined based on the detected value of the parameter, the reference value of the parameter, the reference value of the vertical position at which the reference value of the parameter is associated and a predetermined relationship between the variation in the value of the parameter and the variation in vertical position of the UE 104. The value of the vertical position of the UE 104 defined relative to the second reference vertical position is then determined based on a difference between the determined value of the vertical position of the UE 104 defined relative to the first reference vertical position and the second reference vertical position. The process then ends at step 803.

Some embodiments of the present technique are defined by the following numbered clauses:

1. A terminal device for use with a wireless telecommunications network, the terminal device comprising:
   sensor circuitry configured to detect a value of a parameter which is variable in response to a variation in vertical position of the terminal device;
   receiver circuitry configured to receive, from infrastructure equipment of the wireless telecommunications network, a reference value of the parameter and a reference value of the vertical position at which the reference value of the parameter is associated, the reference value of the vertical position being defined relative to a first reference vertical position;
   processing circuitry configured to determine a value of the vertical position of the terminal device defined relative to a second reference vertical position, wherein the determining comprises:
   determining the second reference vertical position based on a geographical position of the terminal device;
   determining a value of the vertical position of the terminal device defined relative to the first reference vertical position based on the detected value of the parameter, the reference value of the parameter, the reference value of the vertical position at which the reference value of the parameter is associated and a predetermined relationship between the variation in the value of the parameter and the variation in vertical position of the terminal device;

determining the value of the vertical position of the terminal device defined relative to the second reference vertical position based on a difference between the determined value of the vertical position of the terminal device defined relative to the first reference vertical position and the second reference vertical position.

2. A terminal device according to clause 1, wherein the first reference vertical position is sea level.

3. A terminal device according to clause 1 or 2, wherein the second reference vertical position is ground elevation at a geographical position of the terminal device.

4. A terminal device according to clause 3, wherein the receiver circuitry is configured to receive data indicative of the ground elevation at the geographical position of the terminal device from the infrastructure equipment.

5. A terminal device according to clause 4, wherein the data indicative of the ground elevation at the geographical position of the terminal device is received together with the reference value of the parameter and the reference value of the vertical position at which the reference value of the parameter is associated.

6. A terminal device according to clause 4 or 5, wherein the data indicative of the ground elevation at the geographical position of the terminal device comprises geomorphological information associated with the geographical position of the terminal device.

7. A terminal device according to clause 6, wherein the geomorphological information comprises a geomorphological gradient defined between a geographical position at which the reference value of the vertical position at which the reference value of the parameter is associated is defined and the geographical position of the terminal device.

8. A terminal device according to any preceding clause, the terminal device comprising transmitter circuitry configured to transmit a signal to the infrastructure equipment, wherein:

the reference value of the parameter and the reference value of the vertical position at which the reference value of the parameter is associated is received from the infrastructure equipment as data comprised within system information transmitted by the infrastructure equipment, the system information being transmitted by the infrastructure equipment in response to receiving the signal transmitted by the transmitter circuitry.

9. A terminal device according to any preceding clause, wherein the reference value of the parameter and the reference value of the vertical position at which the reference value of the parameter is associated is received together with data indicative of a valid duration of the reference value of the parameter and/or the reference value of the vertical position at which the reference value of the parameter is associated, wherein the processing circuitry is configured to determine the value of the vertical position of the terminal device defined relative to the second reference vertical position based on the reference value of the parameter and/or based on the reference value of the vertical position at which the reference value of the parameter is associated only at a time during the valid duration.

10. A terminal device according to clause 9, wherein, when the valid duration has expired:

the receiver circuitry is configured to receive, from the infrastructure equipment, an updated reference value of the parameter and/or an updated reference value of the vertical position at which the reference value of the parameter is associated, the updated reference value of the vertical position being defined relative to the first reference vertical position; and the processing circuitry is configured to determine an updated value of the vertical position of the terminal device defined relative to the second reference vertical position using the updated reference value of the parameter and/or updated reference value of the vertical position at which the reference value of the parameter is associated.

11. A terminal device according to clause 10, wherein:

the processing circuitry is configured to control the terminal device to operate in a discontinuous reception and/or transmission mode in which, during each of a plurality of first successive time periods, the terminal device is configured to transmit predetermined data to and/or receive predetermined data from the infrastructure equipment and, during each of a plurality of second successive time periods, the terminal device is configured to not transmit the predetermined data to and/or receive the predetermined data from the infrastructure equipment;

the length of each of the first and/or second time periods is determined in accordance with the received valid duration; and the receiver circuitry is configured to receive the updated reference value of the parameter and/or updated reference value of the vertical position at which the reference value of the parameter is associated during one of the first time periods.

12. A terminal device according to any preceding clause, wherein the reference value of the parameter and the reference value of the vertical position at which the reference value of the parameter is associated is received together with data indicative of a valid geographical region of the reference value of the parameter and/or the reference value of the vertical position at which the reference value of the parameter is associated, wherein the processing circuitry is configured to determine the value of the vertical position of the terminal device defined relative to the second reference vertical position based on the reference value of the parameter and/or based on the reference value of the vertical position at which the reference value of the parameter is associated only when the terminal device is geographically positioned within the valid geographical region.

13. A terminal device according to any preceding clause, wherein the processing circuitry is configured to control the terminal device to operate in a discontinuous reception and/or transmission mode in which, during each of a plurality of first successive time periods, the terminal device is configured to transmit predetermined data to and/or receive predetermined data from the infrastructure equipment and, during each of a plurality of second successive time periods, the terminal device is configured to not transmit the predetermined data to and/or receive the predetermined data from the infrastructure equipment, wherein the length of each of the first and/or second repeating time periods is determined in accordance with a characteristic of the parameter.

14. A terminal device according to any preceding clause, wherein the reference value of the parameter is detected using sensor circuitry at a predetermined geographical position and at a vertical position equal to the reference value of the vertical position at which the reference value of the parameter is associated.

15. A terminal device according to clause 14, wherein the sensor circuitry which detects the reference value of the parameter is co-located with the infrastructure equipment.

16. A terminal device according to any preceding clause, wherein the parameter is atmospheric pressure.

17. A terminal device according to any preceding clause, the terminal device comprising further receiver circuitry configured to receive Global Navigation Satellite System (GNSS) signals, wherein the processing circuitry is configured to determine the geographical position of the terminal device using the received GNSS signals.

18. A terminal device according to any preceding clause, the terminal device comprising further receiver circuitry configured to receive a beacon signal from a beacon signal emitting device located at a location, wherein the processing circuitry is configured to determine the geographical position of the terminal device using the received beacon signal and the location of the beacon signal emitting device.

19. A terminal device according to any preceding clause, wherein:
  the reference value of the parameter and the reference value of the vertical position at which the reference value of the parameter is associated are received together with data indicative of an accuracy of the reference value of the parameter and/or the reference value of the vertical position at which the reference value of the parameter is associated; and
  the processing circuitry is configured to determine whether to use the reference value of the parameter and/or the reference value of the vertical position at which the reference value of the parameter is associated depending on the data indicative of the accuracy of the reference value of the parameter and/or the reference value of the vertical position at which the reference value of the parameter is associated and data indicative of a required accuracy of the reference value of the parameter and/or the reference value of the vertical position at which the reference value of the parameter is associated with the terminal device.

20. Infrastructure equipment for use with a wireless telecommunications network, the infrastructure equipment comprising:
  transmitter circuitry configured to transmit, to a terminal device of the wireless telecommunications network, a reference value of a parameter detectable by the terminal device, the parameter being variable in response to a variation in vertical position of the terminal device, and a reference value of the vertical position at which the reference value of the parameter is associated, the reference value of the vertical position being defined relative to a first reference vertical position, wherein:
  the terminal device is configured to determine a value of the vertical position of the terminal device defined relative to a second reference vertical position, the determining comprising:
  determining the second reference vertical position based on a geographical position of the terminal device;
  determining a value of the vertical position of the terminal device defined relative to the first reference vertical position based on a detected value of the parameter, the reference value of the parameter, the reference value of the vertical position at which the reference value of the parameter is associated and a predetermined relationship between the variation in the value of the parameter and the variation in vertical position of the terminal device;
  determining the value of the vertical position of the terminal device defined relative to the second reference vertical position based on a difference between the determined value of the vertical position of the terminal device defined relative to the first reference vertical position and the second reference vertical position.

21. Infrastructure equipment according to clause 20, wherein the first reference vertical position is sea level.

22. Infrastructure equipment according to clause 20 or 21, wherein the second reference vertical position is ground elevation at a geographical position of the terminal device.

23. Infrastructure equipment according to clause 22, wherein the transmitter circuitry is configured to transmit data indicative of the ground elevation at the geographical position of the terminal device to the terminal device.

24. Infrastructure equipment according to clause 23, wherein the data indicative of the ground elevation at the geographical position of the terminal device is transmitted together with the reference value of the parameter and the reference value of the vertical position at which the reference value of the parameter is associated.

25. Infrastructure equipment according to clause 23 or 24, wherein the data indicative of the ground elevation at the geographical position of the terminal device comprises geomorphological information associated with the geographical position of the terminal device.

26. Infrastructure equipment according to clause 25, wherein the geomorphological information comprises a geomorphological gradient defined between a geographical position at which the reference value of the vertical position at which the reference value of the parameter is associated is defined and the geographical position of the terminal device.

27. Infrastructure equipment according to any one of clauses 20 to 26, the infrastructure equipment comprising receiver circuitry configured to receive a signal from the terminal device, wherein:
  the reference value of the parameter and the reference value of the vertical position at which the reference value of the parameter is associated is transmitted to the terminal device as data comprised within system information transmitted by the transmitter circuitry, the system information being transmitted by the transmitter circuitry in response to the receiver circuitry receiving the signal from the terminal device.

28. Infrastructure equipment according to any one of clauses 20 to 27, wherein the reference value of the parameter and the reference value of the vertical position at which the reference value of the parameter is associated is transmitted together with data indicative of a valid duration of the reference value of the parameter and/or the reference value of the vertical position at which the reference value of the parameter is associated, wherein the terminal device is configured to determine the value of the vertical position of the terminal device defined relative to the second reference vertical position based on the reference value of the parameter and/or based on the reference value of the vertical position at which the reference value of the parameter is associated only at a time during the valid duration.

29. Infrastructure equipment according to clause 28, wherein, when the valid duration has expired, the transmitter circuitry is configured to transmit, to the terminal device, an updated reference value of the parameter and/or an updated reference value of the vertical position at which the reference value of the parameter is associated, the updated reference value of the vertical position being defined relative to the first reference vertical position, the terminal device being configured to determine an updated value of the vertical position of the terminal device defined relative to the second reference vertical position using the updated reference value of the parameter and/or updated reference value of the vertical position at which the reference value of the parameter is associated.

30. Infrastructure equipment according to clause 29, the infrastructure equipment comprising processing circuitry configured to control the infrastructure equipment to operate in a discontinuous reception and/or transmission mode in which, during each of a plurality of first successive time periods, the infrastructure equipment is configured to transmit predetermined data to and/or receive predetermined data from the terminal device and, during each of a plurality of second successive time periods, the terminal device is configured to not transmit the predetermined data to and/or receive the predetermined data from the terminal device;
   the length of each of the first and/or second time periods is determined in accordance with the transmitted valid duration; and
   the transmitter circuitry is configured to transmit the updated reference value of the parameter and/or updated reference value of the vertical position at which the reference value of the parameter is associated during one of the first time periods.

31. Infrastructure equipment according to any one of clauses 20 to 30, wherein the reference value of the parameter and the reference value of the vertical position at which the reference value of the parameter is associated is transmitted together with data indicative of a valid geographical region of the reference value of the parameter and/or the reference value of the vertical position at which the reference value of the parameter is associated, the processing circuitry being configured to determine the value of the vertical position of the terminal device defined relative to the second reference vertical position based on the reference value of the parameter and/or based on the reference value of the vertical position at which the reference value of the parameter is associated only when the terminal device is geographically positioned within the valid geographical region.

32. Infrastructure equipment according to any one of clauses 20 to 31, the infrastructure equipment comprising processing circuitry configured to control the infrastructure equipment to operate in a discontinuous reception and/or transmission mode in which, during each of a plurality of first successive time periods, the infrastructure equipment is configured to transmit predetermined data to and/or receive predetermined data from the terminal device and, during each of a plurality of second successive time periods, the infrastructure equipment is configured to not transmit the predetermined data to and/or receive the predetermined data from the terminal device, wherein the length of each of the first and/or second repeating time periods is determined in accordance with a characteristic of the parameter.

33. Infrastructure equipment according to any one of clauses 20 to 32, wherein the reference value of the parameter is detected using sensor circuitry at a predetermined geographical position and at a vertical position equal to the reference value of the vertical position at which the reference value of the parameter is associated.

34. Infrastructure equipment according to clause 33, wherein the sensor circuitry which detects the reference value of the parameter is co-located with the infrastructure equipment.

35. Infrastructure equipment according to any one of clauses 20 to 34, wherein the parameter is atmospheric pressure.

36. Infrastructure equipment according to any one of clauses 20 to 35, wherein:
   the reference value of the parameter and the reference value of the vertical position at which the reference value of the parameter is associated are transmitted together with data indicative of an accuracy of the reference value of the parameter and/or the reference value of the vertical position at which the reference value of the parameter is associated, the terminal device being configured to determine whether to use the reference value of the parameter and/or the reference value of the vertical position at which the reference value of the parameter is associated depending on the data indicative of the accuracy of the reference value of the parameter and/or the reference value of the vertical position at which the reference value of the parameter is associated and data indicative of a required accuracy of the reference value of the parameter and/or the reference value of the vertical position at which the reference value of the parameter is associated with the terminal device.

37. A method of operating a terminal device for use with a wireless telecommunications network, the terminal device comprising sensor circuitry and receiver circuitry, wherein the method comprises:
   controlling the sensor circuitry to detect a value of a parameter which is variable in response to a variation in vertical position of the terminal device;
   controlling the receiver circuitry to receive, from infrastructure equipment of the wireless telecommunications network, a reference value of the parameter and a reference value of the vertical position at which the reference value of the parameter is associated, the reference value of the vertical position being defined relative to a first reference vertical position; and
   determining a value of the vertical position of the terminal device defined relative to a second reference vertical position, wherein the determining comprises:
   determining the second reference vertical position based on a geographical position of the terminal device;
   determining a value of the vertical position of the terminal device defined relative to the first reference vertical position based on the detected value of the parameter, the reference value of the parameter, the reference value of the vertical position at which the reference value of the parameter is associated and a predetermined relationship between the variation in the value of the parameter and the variation in vertical position of the terminal device;
   determining the value of the vertical position of the terminal device defined relative to the second reference vertical position based on a difference between the determined value of the vertical position of the terminal device defined relative to the first reference vertical position and the second reference vertical position.

38. A method of operating infrastructure equipment for use with a wireless telecommunications network, the infrastructure equipment comprising transmitter circuitry, wherein the method comprises:
   controlling the transmitter circuitry configured to transmit, to a terminal device of the wireless telecommunications network, a reference value of a parameter detectable by the terminal device, the parameter being variable in response to a variation in vertical position of the terminal device, and a reference value of the vertical position at which the reference value of the parameter is associated, the reference value of the vertical position being defined relative to a first reference vertical position, wherein:

the terminal device is configured to determine a value of the vertical position of the terminal device defined relative to a second reference vertical position, the determining comprising:

determining the second reference vertical position based on a geographical position of the terminal device;

determining a value of the vertical position of the terminal device defined relative to the first reference vertical position based on a detected value of the parameter, the reference value of the parameter, the reference value of the vertical position at which the reference value of the parameter is associated and a predetermined relationship between the variation in the value of the parameter and the variation in vertical position of the terminal device;

determining the value of the vertical position of the terminal device defined relative to the second reference vertical position based on a difference between the determined value of the vertical position of the terminal device defined relative to the first reference vertical position and the second reference vertical position.

39. Circuitry for a terminal device for use with a wireless telecommunications network, the circuitry comprising:

sensor circuitry configured to detect a value of a parameter which is variable in response to a variation in vertical position of the terminal device;

receiver circuitry configured to receive, from infrastructure equipment of the wireless telecommunications network, a reference value of the parameter and a reference value of the vertical position at which the reference value of the parameter is associated, the reference value of the vertical position being defined relative to a first reference vertical position;

processing circuitry configured to determine a value of the vertical position of the terminal device defined relative to a second reference vertical position, wherein the determining comprises:

determining the second reference vertical position based on a geographical position of the terminal device;

determining a value of the vertical position of the terminal device defined relative to the first reference vertical position based on the detected value of the parameter, the reference value of the parameter, the reference value of the vertical position at which the reference value of the parameter is associated and a predetermined relationship between the variation in the value of the parameter and the variation in vertical position of the terminal device;

determining the value of the vertical position of the terminal device defined relative to the second reference vertical position based on a difference between the determined value of the vertical position of the terminal device defined relative to the first reference vertical position and the second reference vertical position.

40. Circuitry for infrastructure equipment for use with a wireless telecommunications network, the circuitry comprising:

transmitter circuitry configured to transmit, to a terminal device of the wireless telecommunications network, a reference value of a parameter detectable by the terminal device, the parameter being variable in response to a variation in vertical position of the terminal device, and a reference value of the vertical position at which the reference value of the parameter is associated, the reference value of the vertical position being defined relative to a first reference vertical position, wherein:

the terminal device is configured to determine a value of the vertical position of the terminal device defined relative to a second reference vertical position, the determining comprising:

determining the second reference vertical position based on a geographical position of the terminal device;

determining a value of the vertical position of the terminal device defined relative to the first reference vertical position based on a detected value of the parameter, the reference value of the parameter, the reference value of the vertical position at which the reference value of the parameter is associated and a predetermined relationship between the variation in the value of the parameter and the variation in vertical position of the terminal device;

determining the value of the vertical position of the terminal device defined relative to the second reference vertical position based on a difference between the determined value of the vertical position of the terminal device defined relative to the first reference vertical position and the second reference vertical position.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] http://www.3gpp.org/DynaReport/36-series.htm
[2] http://www.3gpp.org/DynaReport/38-series.htm

The invention claimed is:

1. A terminal device for use with a wireless telecommunications network, the terminal device comprising:
sensor circuitry configured to detect a value of a parameter which is variable in response to a variation in vertical position of the terminal device;
receiver circuitry configured to receive, from infrastructure equipment of the wireless telecommunications network, a reference value of the parameter and a reference value of the vertical position at which the reference value of the parameter is associated, the reference value of the vertical position being defined relative to a first reference vertical position;
processing circuitry configured to determine a value of the vertical position of the terminal device defined relative to a second reference vertical position, wherein the determining comprises:
determining the second reference vertical position based on a geographical position of the terminal device;
determining a value of the vertical position of the terminal device defined relative to the first reference vertical position based on the detected value of the parameter, the reference value of the parameter, the reference value of the vertical position at which the reference value of the parameter is associated and a predetermined relationship between the variation in the value of the parameter and the variation in vertical position of the terminal device; and
determining the value of the vertical position of the terminal device defined relative to the second reference vertical position based on a difference between the determined value of the vertical position of the terminal device defined relative to the first reference vertical position and the second reference vertical position,
wherein the reference value of the parameter and the reference value of the vertical position at which the reference value of the parameter is associated is received together with data indicative of one or more of a valid duration of the reference value of the parameter and the reference value of the vertical position at which the reference value of the parameter is associated, wherein the valid duration is updateable based on a prediction of upcoming differences in atmospheric pressure based on weather information, wherein a horizontal position associated with a beacon ID is measured by the user equipment.

2. The terminal device according to claim 1, wherein the first reference vertical position is sea level.

3. The terminal device according to claim 1, wherein the second reference vertical position is ground elevation at a geographical position of the terminal device.

4. The terminal device according to claim 3, wherein the receiver circuitry is configured to receive data indicative of the ground elevation at the geographical position of the terminal device from the infrastructure equipment.

5. The terminal device according to claim 4, wherein the data indicative of the ground elevation at the geographical position of the terminal device is received together with the reference value of the parameter and the reference value of the vertical position at which the reference value of the parameter is associated.

6. The terminal device according to claim 4, wherein the data indicative of the ground elevation at the geographical position of the terminal device comprises geomorphological information associated with the geographical position of the terminal device.

7. The terminal device according to claim 6, wherein the geomorphological information comprises a geomorphological gradient defined between a geographical position at which the reference value of the vertical position at which the reference value of the parameter is associated is defined and the geographical position of the terminal device.

8. The terminal device according to claim 1, the terminal device comprising transmitter circuitry configured to transmit a signal to the infrastructure equipment, wherein:
the reference value of the parameter and the reference value of the vertical position at which the reference value of the parameter is associated is received from the infrastructure equipment as data comprised within system information transmitted by the infrastructure equipment, the system information being transmitted by the infrastructure equipment in response to receiving the signal transmitted by the transmitter circuitry.

9. The terminal device according to claim 1, wherein the processing circuitry is configured to determine the value of the vertical position of the terminal device defined relative to the second reference vertical position based on the reference value of the parameter and/or based on the reference value of the vertical position at which the reference value of the parameter is associated only at a time during the valid duration.

10. The terminal device according to claim 9, wherein, when the valid duration has expired:
the receiver circuitry is configured to receive, from the infrastructure equipment, an updated reference value of the parameter and/or an updated reference value of the vertical position at which the reference value of the parameter is associated, the updated reference value of the vertical position being defined relative to the first reference vertical position; and
the processing circuitry is configured to determine an updated value of the vertical position of the terminal device defined relative to the second reference vertical position using the updated reference value of the parameter and/or updated reference value of the vertical position at which the reference value of the parameter is associated.

11. The terminal device according to claim 10, wherein:
the processing circuitry is configured to control the terminal device to operate in a discontinuous reception and/or transmission mode in which, during each of a plurality of first successive time periods, the terminal device is configured to transmit predetermined data to and/or receive predetermined data from the infrastructure equipment and, during each of a plurality of second successive time periods, the terminal device is configured to not transmit the predetermined data to and/or receive the predetermined data from the infrastructure equipment;
the length of each of the first and/or second time periods is determined in accordance with the received valid duration; and
the receiver circuitry is configured to receive the updated reference value of the parameter and/or updated reference value of the vertical position at which the reference value of the parameter is associated during one of the first time periods.

12. The terminal device according to claim 1, wherein the reference value of the parameter and the reference value of the vertical position at which the reference value of the parameter is associated is received together with data indicative of a valid geographical region of the reference value of the parameter and/or the reference value of the vertical position at which the reference value of the parameter is associated, wherein the processing circuitry is configured to determine the value of the vertical position of the terminal device defined relative to the second reference vertical position based on the reference value of the parameter and/or based on the reference value of the vertical position at which the reference value of the parameter is associated only when the terminal device is geographically positioned within the valid geographical region.

13. The terminal device according to claim 1, wherein the processing circuitry is configured to control the terminal device to operate in a discontinuous reception and/or transmission mode in which, during each of a plurality of first successive time periods, the terminal device is configured to transmit predetermined data to and/or receive predetermined data from the infrastructure equipment and, during each of a plurality of second successive time periods, the terminal device is configured to not transmit the predetermined data to and/or receive the predetermined data from the infrastructure equipment, wherein the length of each of the first and/or second repeating time periods is determined in accordance with a characteristic of the parameter.

14. The terminal device according to claim 1, wherein the reference value of the parameter is detected using sensor circuitry at a predetermined geographical position and at a vertical position equal to the reference value of the vertical position at which the reference value of the parameter is associated.

15. The terminal device according to claim 14, wherein the sensor circuitry which detects the reference value of the parameter is co-located with the infrastructure equipment.

16. The terminal device according to claim 1, wherein the parameter is atmospheric pressure.

17. The terminal device according to claim 1, the terminal device comprising further receiver circuitry configured to receive Global Navigation Satellite System (GNSS) signals, wherein the processing circuitry is configured to determine the geographical position of the terminal device using the received GNSS signals.

18. The terminal device according to claim 1, the terminal device comprising further receiver circuitry configured to receive a beacon signal from a beacon signal emitting device located at a location, wherein the processing circuitry is configured to determine the geographical position of the terminal device using the received beacon signal and the location of the beacon signal emitting device.

19. The terminal device according to claim 1, wherein:
the reference value of the parameter and the reference value of the vertical position at which the reference value of the parameter is associated are received together with data indicative of an accuracy of the reference value of the parameter and/or the reference value of the vertical position at which the reference value of the parameter is associated; and
the processing circuitry is configured to determine whether to use the reference value of the parameter and/or the reference value of the vertical position at which the reference value of the parameter is associated depending on the data indicative of the accuracy of the reference value of the parameter and/or the reference value of the vertical position at which the reference value of the parameter is associated and data indicative of a required accuracy of the reference value of the parameter and/or the reference value of the vertical position at which the reference value of the parameter is associated with the terminal device.

20. Infrastructure equipment for use with a wireless telecommunications network, the infrastructure equipment comprising:
transmitter circuitry configured to transmit, to a terminal device of the wireless telecommunications network, a reference value of a parameter detectable by the terminal device, the parameter being variable in response to a variation in vertical position of the terminal device, and a reference value of the vertical position at which the reference value of the parameter is associated, the reference value of the vertical position being defined relative to a first reference vertical position, wherein:
the terminal device is configured to determine a value of the vertical position of the terminal device defined relative to a second reference vertical position, the determining comprising:
determining the second reference vertical position based on a geographical position of the terminal device;
determining a value of the vertical position of the terminal device defined relative to the first reference vertical position based on a detected value of the parameter, the reference value of the parameter, the reference value of the vertical position at which the reference value of the parameter is associated and a predetermined relationship between the variation in the value of the parameter and the variation in vertical position of the terminal device; and
determining the value of the vertical position of the terminal device defined relative to the second reference vertical position based on a difference between the determined value of the vertical position of the terminal device defined relative to the first reference vertical position and the second reference vertical position,
wherein the reference value of the parameter and the reference value of the vertical position at which the reference value of the parameter is associated is received together with data indicative of one or more of a valid duration of the reference value of the parameter and the reference value of the vertical position at which the reference value of the parameter is associated, wherein the valid duration is updateable based on a prediction of upcoming differences in atmospheric pressure based on weather information, wherein a horizontal position associated with a beacon ID is measured by the user equipment.

* * * * *